Nov. 14, 1950        A. D. SINGH        2,529,710

METHOD OF STERILIZING

Filed Oct. 30, 1947

Inventor
ALAMJIT D. SINGH by The Firm of Charles W Hills Attys.

Patented Nov. 14, 1950

2,529,710

UNITED STATES PATENT OFFICE 2,529,710

METHOD OF STERILIZING

Alamjit D. Singh, Chicago, Ill., assignor to Institute of Gas Technology, Chicago, Ill., a corporation of Illinois Application October 30, 1947, Serial No. 782,984

4 Claims. (Cl. 99—153)

This invention relates to a method for sterilizing farinaceous material, in particular, corn meal and the like.

Heretofore, considerable difficulty has been encountered in the heat sterilization of farinaceous material such as corn meal, wheat and other flours and the like, since such material tend to be discolored at elevated temperatures. Further, corn meal and the like often contain moisture in an amount sufficient to induce some tendency to lumping or at least to interfere with agitation or mixing of a body of corn meal being heat sterilized. Such agitation or mixing is required in the heat sterilization of a static body of corn meal or the like, to insure uniform sterilization and to prevent local overheating with resultant discoloration. For this reason, it has heretofore been found necessary, in many instances, to subject corn meal or the like to a preliminary drying step before heat sterilization.

It is therefore an important object of the present invention to provide a method for heat sterilizing corn meal or the like operative without any preliminary drying and capable of yielding a sterile product of satisfactory color and uniform bacteria count.

Figure 1:
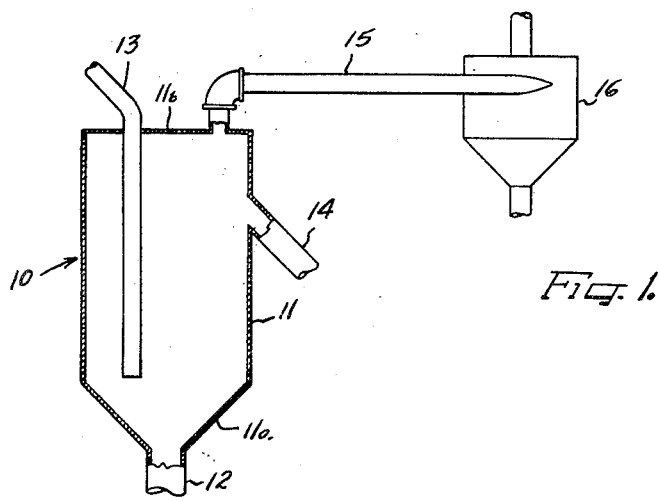
Figure 2:
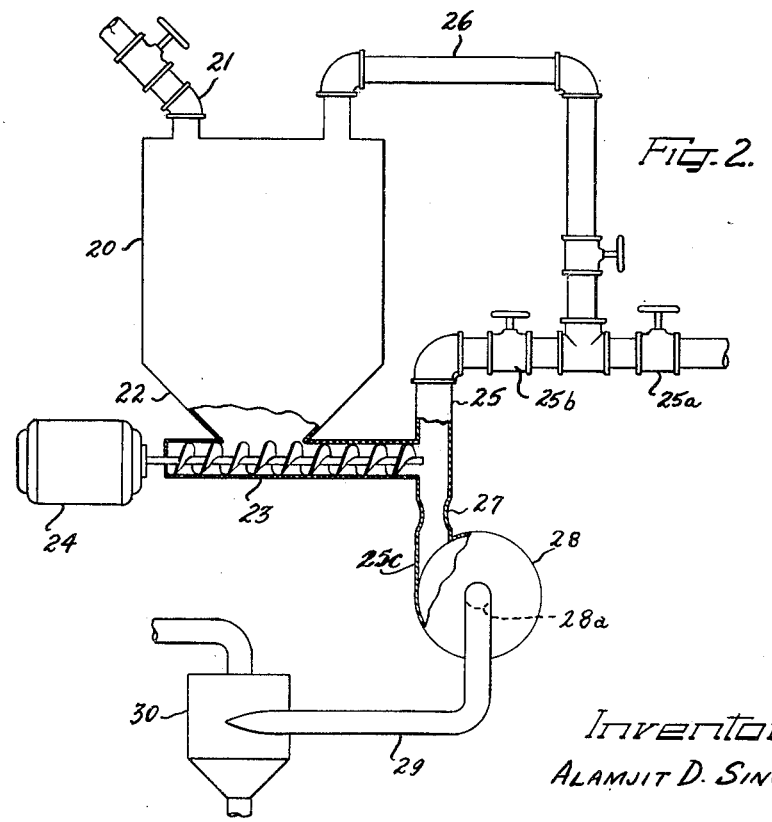

Other and further objects and features of the present invention will become apparent from the following description and appended claims. The drawings show, diagrammatically and by way of example, apparatus for carrying out the method of this invention. More particularly:

Figure 1 is an elevation, with parts shown in vertical section, of a fluidizing apparatus; and Figure 2 is an elevation, with parts shown in vertical section, of a flash pulverizing apparatus-vortex disintegrator combination.

In proceeding according to the present invention, corn meal or the like is initially treated in the fluidizing apparatus indicated generally in Fig. 1 by the reference numeral 10. This apparatus includes a generally cylindrical closed vertical fluidizing chamber 11 having a conical bottom portion 11a into the apex of which air may be introduced from an air conduit 12. Raw corn meal is introduced into the bottom portion of the fluidizing chamber 11 through a generally vertical conduit 13 entering the fluidizing chamber through its cover 11b and extending downwardly to a point adjacent to but spaced from the conical bottom 11a. In the fluidizing chamber 11, the corn meal introduced through the conduit 13 is maintained in fluidized condition by the air admitted through the conduit 12. The corn meal is discharged from the fluidizing chamber 11 through a discharge conduit 14 arranged near the top of the fluidizing chamber 11. The air is vented from the fluidizing chamber 11 through a conduit 15 communicating with the interior of the chamber 11 through its roof 11b and discharging into a cyclone separator 16 adapted to recover such finely divided material as may be swept along by the air.

In the fluidizing chamber 11, sterilizing temperature may be effected solely by passing air through the fluidizing chamber air of sufficiently elevated temperature, or the fluidizing chamber may also be heated externally to effect heat transfer to the corn meal through the walls of the fluidizing chamber. Such external heating is made possible by the thorough intermingling effected by the fluidizing gas which, of course, need not be air but may be nitrogen or other inert gas.

Corn meal may have a bacteria count, for instance, of about 1300 per 10 grams. For most satisfactory sterilization, the bacteria count should be reduced to below 125 per 10 grams, without discoloring the corn meal to an excessive degree. I have found that satisfactory sterilization can be effected in the apparatus of Fig. 1, without excessive discoloration, by maintaining the fluidized bed in the fluidizing chamber 11 at a temperature of at least 135° C. and ranging upwardly to 150° C. or higher. However, it is necessary not only to control the temperature within the fluidizing chamber, but also to adjust the average time during which the corn meal is allowed to stay in the fluidizing chamber (hereinafter referred to as the "residence time"). Such regulation is effected by adjusting the rate of feeding of corn meal into the fluidizing chamber, since discharge of corn meal from the fluidizing chamber is due to displacement of corn meal already present in the fluidizing chamber by additional corn meal introduced into the fluidizing chamber. In general, at a temperature of 135° C., the corn meal should be allowed to remain in the fluidizing chamber for at least 25 minutes (for most satisfactory reduction of bacteria count) and may remain in the fluidizing chamber for as long as 30 or 40 minutes without objectionable discoloration. At a temperature of about 150° C., objectionable discoloration will occur at a residence time of 40 minutes or longer, but satisfactory reduction in bacteria count without discoloration may be accomplished at a residence time of from 10 to 35 minutes. At temperatures above 150° C., the residence time should be reduced as may be necessary to prevent discoloration while insuring satisfactory reduction in bacteria count.

By way of example, I tabulate hereinbelow the results obtained in sterilizing several batches of corn meal having a bacteria count of 1300 in an apparatus such as the one shown in Fig. 1:

| Temperature | Residence Time | Rate of Flow of Air | Residual Thermophilic Bacteria per 10 grams | Color |
|---|---|---|---|---|
| °C. | Minutes | Cu. Ft./min. | | |
| 135 | 29 | 5 | 40 | Satisfactory. |
| 135 | 29 | 5 | 85 | Do. |
| 135 | 30 | 5 | 110 | Do. |
| 150 | 12 | 5 | 25 | Do. |
| 150 | 18 | 7 | 0 | Good. |
| 150 | 34 | 5 | 20 | Satisfactory. |

It will thus be noted that, at certain temperatures and residence times, satisfactory sterilization without excessive discolorization may be achieved by passing corn meal through a fluidizing chamber. However, objectionable discoloration may be effected, for instance, at a temperature of 150° C. and a residence time of 44 minutes, along with complete sterilization of the corn meal. When such discoloration occurs, the sterilized corn meal may be treated in the apparatus of Fig. 2, for reducing or eliminating the discoloration without any increase in bacteria count. Fig. 2 shows a flash pulverizing device described in more detail in the application of John I. Yellott, Serial No. 530,177, filed April 8, 1944, now abandoned, and entitled "Method of and Apparatus for Flash Pulverizing." Reference is made to said application for a complete description. Essentially, the flash pulverizing apparatus of Fig. 2 includes a hopper 20 adapted to receive sterilized somewhat discolored corn meal through a valved inlet conduit 21. The hopper 20 is provided at its lower or discharge end with frustoconical bottom 22 communicating with a horizontally extending tubularly enclosed screw feeder or conveyor 23 driven by a motor 24. The screw conveyor 23 moves the corn meal into the lower end portion of a vertically extending conduit 25. Hot air, superheated steam or other gas under pressure is admitted into the upper part of the tank 20 through a valved conduit 26 branching off from the conduit 25 the other end of which is connected to a source of hot air, superheated steam or other gas under pressure. Valves 25a and 25b in the conduit 25 on either side of the conduit 26 makes possible the control of the admission of gas under pressure into the conduits 25 and 26.

The lower end portion of the conduit 25, downstream of the discharge opening of the screw conveyor 23, is sharply constricted, as at 27, to form a convergent-divergent nozzle followed by a short conduit 25c of approximately the same diameter as the remainder of the conduit 25. This nipple discharges tangentially into a vortex chamber 28 having a central axial discharge aperture 28a communicating through a conduit 29 with a cyclone separator 30. The function of the vortex chamber 30 is described more fully in the application by John I. Yellott entitled "Comminution Device," filed July 22, 1947, Serial No. 762,589, now Patent No. 2,515,541, issued July 18, 1950. Reference is made to this copending application for further details.

At the start of the operation of the apparatus of Figure 2, the corn meal or other farinaceous material to be treated is charged through the conduit 21 into the hopper 20. The valve in the conduit 21 is closed, and the valves in the conduits 25 and 26 are opened. Hot air, superheated steam or other gas such as nitrogen under pressure is introduced through the conduit 26 into the tank 20 and caused to flow through the conduit 25. The screw conveyor 23 is operated to advance the corn meal into the stream of air or other gas under pressure passing through the conduit 25 in a downward direction. The nozzle 27 is so spaced from the discharge opening of a screw conveyor 23 that the corn meal discharged into the conduit 25 will attain approximately the same speed as the gas flowing through the conduit 25 before reaching the nozzle 27. Instantaneous expansion occurs continuously as the compressed gas in the conduit 25 passes through the nozzle 27 and causes an explosive shattering of the corn meal particles by virtue of the expansion of compressed air or other gas contained within the porosities of the particles. From the nozzle 27, the expanded gas-comminuted corn meal mixture passes through the nipple 25c into the vortex chamber 28, where the coarser particles are further comminuted, as by impact or attrition, while the finer particles as well as the further comminuted particles are carried in gaseous suspension through the conduit 29 into the separator 30 and there recovered, the gas being vented from the separator.

The operating pressure for the air or other gas in the conduit 25 should be at least 5 lbs. per sq. in. and preferably is around 100 to 140 lbs. per sq. in. or higher. Hot air or superheated steam are suitably employed at a temperature sufficient to insure sterility. At the above mentioned operating pressure of about 140 lbs. per sq. in. in the conduit 25, the pressure in the nipple 25c may suitably be about 15 to 60 lbs. per sq. in. or less. An acceleration to critical velocity should be brought about in the nozzle 27, together with a concurrent, practically instantaneous expansion in volume of the gas to at least about double its volume upstream of the nozzle 27.

It should be understood that the extent of comminution is determined, inter alia, by the difference between the upstream and the downstream pressures on the two sides of the nozzle 27, by the ratio of gas to solids passing through the nozzle 27, and by the rate of movement of solids through the nozzle 27. Finer comminution is effected by the maintenance of maximum difference between upstream and downstream pressure, by the use of relatively large amounts of gas as compared to the amount of solids, and by the establishment of rapid flow of solids through the nozzle. In the case of corn meal sterilized but slightly discolored by treatment in the apparatus of Fig. 1, restoration of the original color of the corn meal can be effected by treatment in the apparatus of Fig. 2. The sterilization effected by treatment in the apparatus of Fig. 1 is not affected by flash pulverization in the apparatus of Fig. 2. As a matter of fact, a decided reduction in bacteria count can be effected by passage of corn meal solely through the flash pulverizing apparatus of Fig. 2, although the bacteria count may not be reduced below 125. Further, the flash pulverizing apparatus of Fig. 2 is easily kept in sterile condition when not used and can easily be sterilized before being used, if not sterile before such use. Note that there are no locations within the flash pulverizing apparatus of Fig. 2 where small amounts of corn meal might tend to accumulate or become pocketed, with consequent opportunity for growth of microorganisms. Further, the whole interior of the apparatus is accessible to hot gas at a sterilizing temperature.

It should be understood that, with respect to the fluidizing treatment described hereinabove, such treatment may be subdivided into several stages carried out in two or more pieces of fluidizing apparatus such as that of Fig. 1. In some instances, such subdivision of the fluidizing sterilization is advantageous, for the reason that the "residence time" referred to hereinabove signifies the average time at which the corn meal particle remains in the fluidizing chamber. A small number of corn meal particles pass more or less directly from the discharge aperture of the conduit 13 into the discharge conduit 14 and therefore do not remain as long as other particles in the fluidizing chamber, with the result that the corn meal particles in question may not be as completely sterilized as other corn meal particles. By subdividing the fluidizing treatment into several stages, I insure that practically all corn meal particles will remain in the fluidizing chambers for very nearly the same total length of time. It should further be understood that, for most purposes, treatment in only the fluidizing chamber is quite sufficient to yield the sterile corn meal of satisfactory color. Nevertheless, treatment in the fluidizing chamber followed by flash pulverizing makes possible the use of higher temperatures or a longer "residence time" in the fluidizing step than would otherwise be possible.

If desired, the fluidizing treatment with a hot gas may be preceded by flash pulverization, for the purpose of reducing the bacteria count and for drying the corn meal.

It should further be understood that the above described flash pulverizing step may be carried out with or without passing the product of the flash pulverizing apparatus through the vortex chamber 28. The latter utilizes individual energy to comminute further the products of the flash pulverizing apparatus, the coarser particles being preferentially comminuted due to the centrifugal forces exerted within the vortex chamber.

If desired, the hot gases vented from the separator 30 may be fed to the fluidizing chamber 11 for use as sterilizing medium.

Many details of procedure and construction may be varied within a wide range without departing from the principles of this invention and without sacrificing the advantages disclosed hereinabove and it is therefore not my purpose to limit the patent granted on this invention otherwise than necessitated by the scope of the appended claims.

I claim as my invention:

1. A method of sterilizing corn meal which comprises feeding said corn meal into a confined space accessible to the traversing flow of a gas therethrough, flowing a gas through said space at a rate sufficient to fluidize said corn meal, maintaining the temperature within said space high enough to sterilize said corn meal, discharging corn meal from said space, forming the discharged corn meal into a suspension in a rapidly flowing gas under pressure and suddenly expanding the flowing gaseous suspension of corn meal to explosively shatter said corn meal whereby in the event of discoloration effected during said sterilizing step the color of the corn meal is improved.

2. A method of sterilizing corn meal which comprises confining a body of said corn meal within a space accessible to the traversing flow of a hot gas therethrough, flowing a hot gas through said space at a rate sufficient to fluidize said corn meal while maintaining the temperature of said space at at least 135° C. for a time sufficient to reduce the bacteria count of said corn meal to less than 125 per each 10 grams, thereafter forming the sterilized corn meal into a rapidly flowing suspension in a gas under pressure and instantaneously expanding said gas at least two fold to explosively shatter the suspended corn meal whereby any discoloration effected during sterilization is eliminated.

3. A method of sterilizing a farinaceous material which comprises feeding said material into a confined space accessible to the traversing flow of a gas therethrough, flowing a gas through said space at a rate sufficient to fluidize said material, maintaining the temperature within said space high enough to sterilize said corn meal, discharging said material from said space, forming the discharged material into a suspension in a rapidly flowing gas under pressure, suddenly expanding the flowing gaseous suspension to explosively shatter said material, and then forming the resulting suspension of shattered material into a vortex, said vortex being confined within an annular space, whereby the explosively shattered corn meal is further comminuted, said explosion shattering and further comminuting steps serving to eliminate any discoloration effected during said sterilizing step.

4. A method of sterilizing corn meal which comprises heating said corn meal in a confined space accessible to the traversing flow of a gas therethrough, flowing a gas through said space at a rate sufficient to fluidize said corn meal, maintaining the temperature within said space high enough to sterilize said corn meal, discharging corn meal from said space when said corn meal has been sterilized, forming the discharged corn meal into suspension in a flowing hot gas under pressure, suddenly expanding the flowing gaseous suspension of corn meal to at least twice its original volume to explosively shatter said corn meal, confining the resulting suspension of explosively shattered corn meal in said hot gas within an annular space to form said suspension of explosively shattered corn meal into a vortex wherein coarser particles are further comminuted, and separating the explosively shattered and further comminuted corn meal from said hot gas, said explosive shattering and said further comminution of said corn meal serving to eliminate any discoloration effected in said sterilizing step.

ALAMJIT D. SINGH.

REFERENCES CITED

The following references are of record in the file of this patent:

UNITED STATES PATENTS

| Number | Name | Date |
|---|---|---|
| 1,578,609 | Mason | Mar. 30, 1926 |
| 1,655,618 | Mason | Jan. 10, 1928 |
| 2,032,827 | Andrews | May 3, 1936 |
| 2,212,120 | Kneale et al. | Aug. 20, 1940 |
| 2,266,292 | Arnold | Dec. 16, 1941 |
| 2,348,066 | Goldfine | May 2, 1944 |

OTHER REFERENCES

Disinfection and the Preservation of Food—by Rideal (1903), page 32.